Dec. 31, 1929.  C. MIEVILLE  1,741,870
THERMOELECTRIC COUPLE
Filed April 27, 1926  4 Sheets-Sheet 1

Inventor
Charles Mieville
By _____ atty.

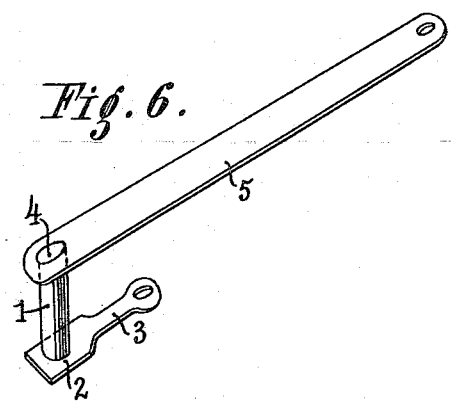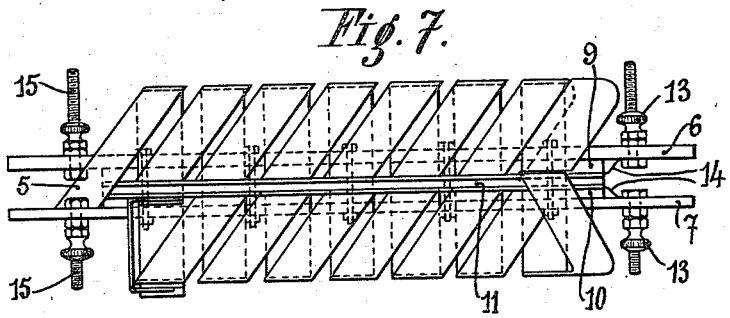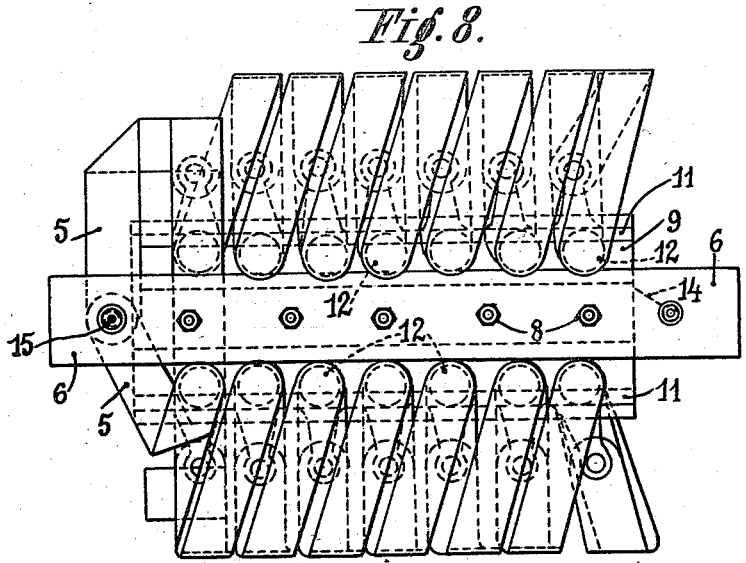

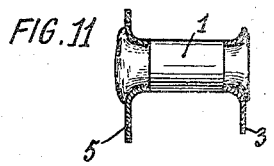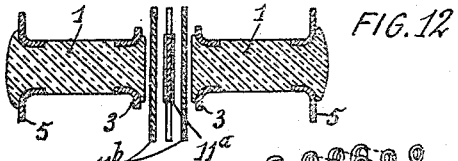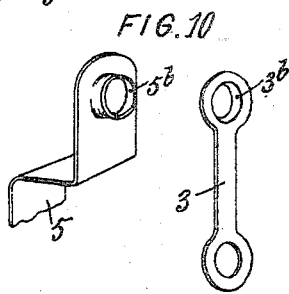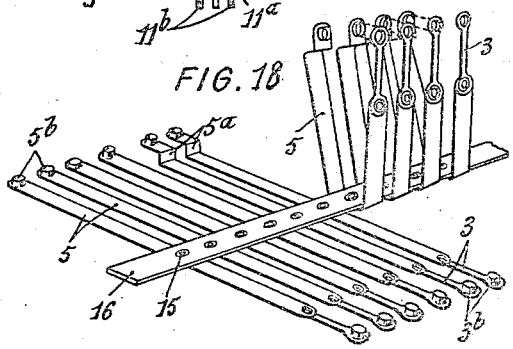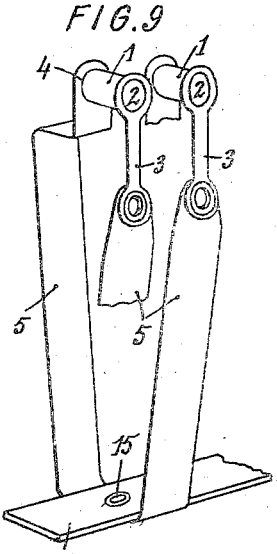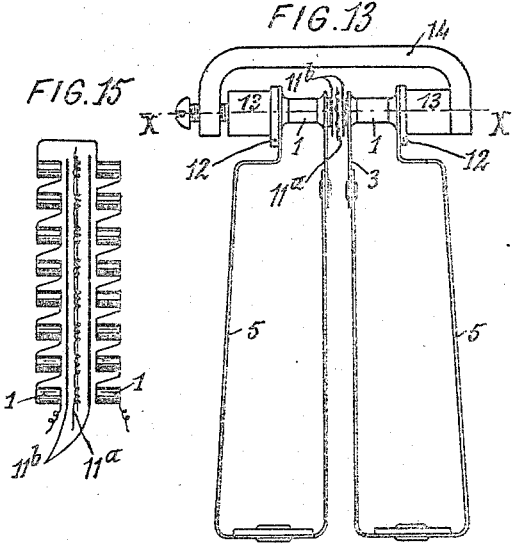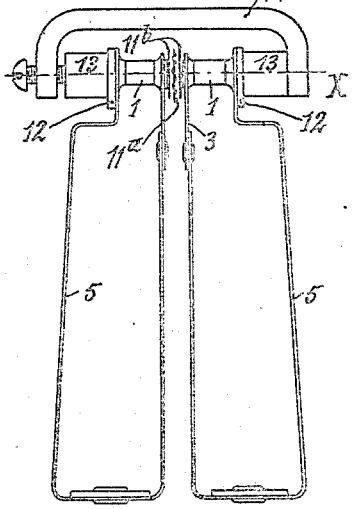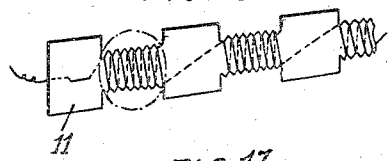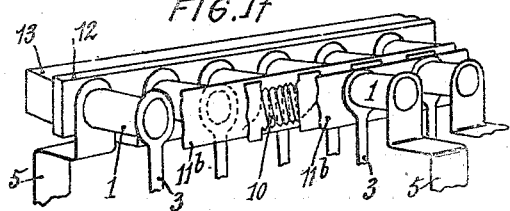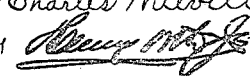

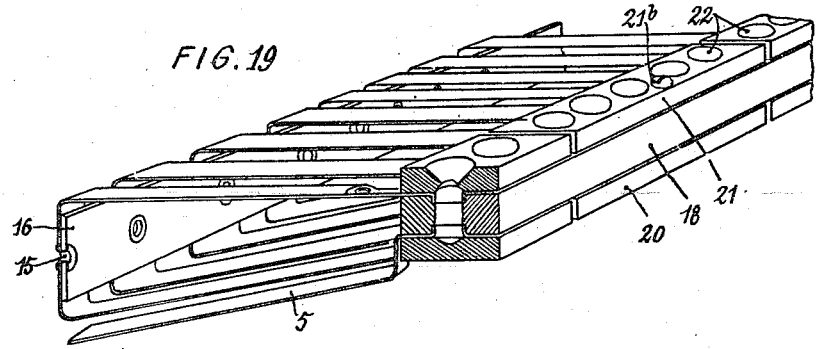
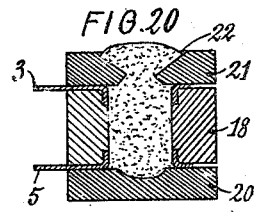
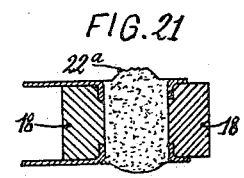
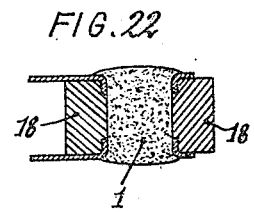
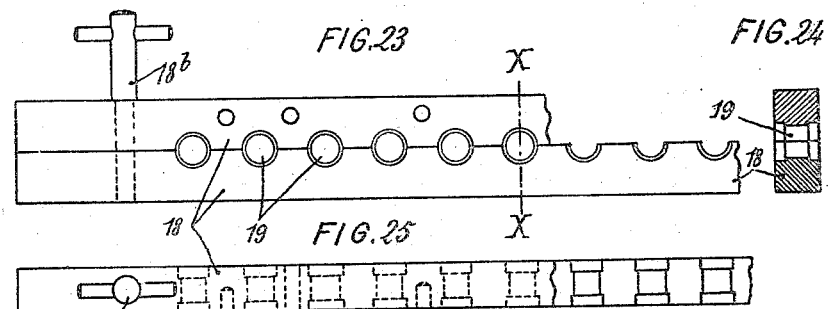
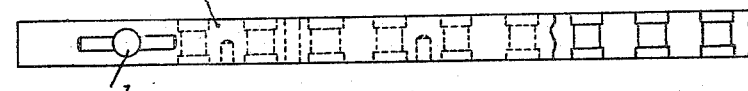
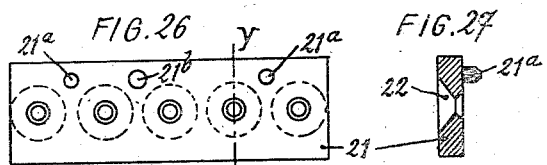
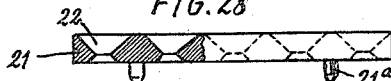
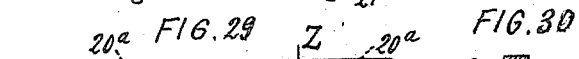
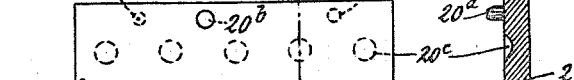
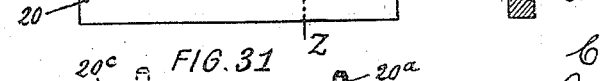

Patented Dec. 31, 1929

1,741,870

UNITED STATES PATENT OFFICE

CHARLES MIEVILLE, OF PARIS, FRANCE

THERMOELECTRIC COUPLE

Application filed April 27, 1926, Serial No. 105,025, and in France July 25, 1925.

The present invention relates to an arrangement of thermo-electric elements for the supply of continuous current at low voltage, in which the heating required for the production of this current comes from heating elements connected with the current of a main supply line.

To secure a suitable efficiency from such an arrangement, it is necessary to obtain the maximum temperature between the thermo-electric joints with minimum heating, i. e. with a small consumption of current from the main line, and on the other hand to reduce the internal resistance of the circuit to a minimum. This result is obtained by the arrangement which is hereinafter described.

The appended drawings, to which reference is given, are as follows:

Fig. 6 shows a thermo-electric element of the apparatus in a preferred form of construction, which is shown solely by way of example.

Figs. 7 and 8 are respectively an elevational and a plan view of the apparatus which is disposed according to a preferred form of construction.

Fig. 9 shows a thermo-electric element.

Fig. 10 shows the form of the ends of the members forming the hot and cold joints.

Fig. 11 is a vertical section of Fig. 10, after the moulding operation.

Fig. 12 is a horizontal section of the apparatus on the line X—X of Fig. 13.

Fig. 13 is an end view of the apparatus.

Fig. 14 is a plan view of Fig. 13.

Fig. 15 shows the heating method.

Fig. 16 is a detail view of the heating resistance.

Fig. 17 is a perspective view of the apparatus, partly in section.

Figs. 18 to 31 relate to the manufacture of the thermo-electric battery.

Figs. 18 to 22 relates to the moulding of the cylinders.

Fig. 23 is a plan view of the mould.

Fig. 24 is a section on the line X—X of Fig. 23.

Fig. 25 is an elevational view.

Fig. 26 is a plan view of a mould plate.

Fig. 27 is a section on the line Y—Y.

Fig. 28 is an elevational view, partly in section.

Fig. 29 is a plan view of the bottom plate of the mould.

Fig. 30 is a section on the line Z—Z.

Fig. 31 is an elevational view, partly in section.

Figure 1:
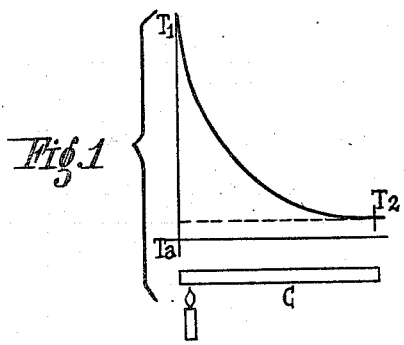
Fig. 1 is the curve for the temperature prevailing along a metallic conductor which is heated at one end.

When a metallic conductor C is heated at one end, the temperature which prevails along the conductor is represented by an exponential curve of the type indicated in Fig. 1, in which $T^1$ is the temperature of the heated end, $T^2$ that of the other end, and $T^a$ the room temperature.

In the construction of thermo-electric couples or elements, one is led to utilize the metal or alloys having a high specific electric resistance, for in general, only such metals or alloys have a relatively great thermo-electric action. For this reason it becomes difficult to form thermo-electric circuits whose cooling surface is sufficient in order that the difference of temperature between the hot and cold thermo-electric joints shall be considerable whilst the electric resistance of the circuit is not too high which would cause an excessive fall of tension in the closed circuit.

The calorific power absorbed in the heating of the hot thermo-electric joints will be greater (for the same materials) as the section of the joints is larger. It is therefore of the first importance to increase the cooling surface relatively to the resistance of the circuit so as to obtain the greatest possible difference in temperature between the hot and cold thermo-electric joints, and to diminish the section of the joints to be heated, so as to reduce the power required for the heating of the latter.

The present invention has for its object to allow the construction of thermo-electric couples with metals or alloys of high electric resistivity while maintaining the internal resistance of the circuit at a very small value, and setting up a maximum difference in temperature between the two groups of thermo-electric joints, by an increase in the cooling surface without any appreciable increase in the electric resistance of the circuit.

Figure 2:
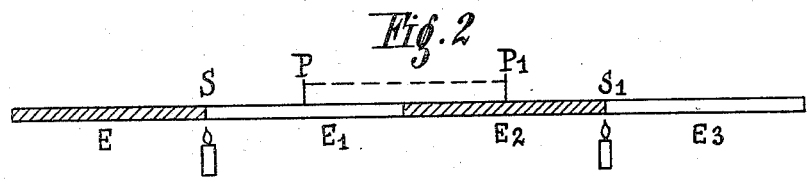
Fig. 2 is a thermo-electric circuit.
Figure 3:
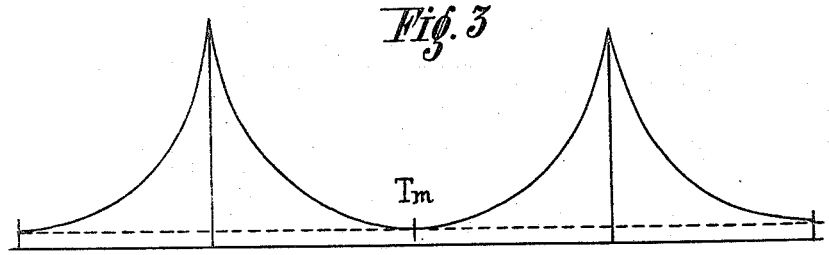
Fig. 3 is the curve for the different temperature along this circuit.

Fig. 2 shows a thermo-electric circuit comprising two elements E, E¹ and E², E³, whose joints S and S¹ are heated by any suitable means. Fig. 3 shows the curve representing the different temperatures along the circuit thus formed. For a given section, the electric resistance will depend upon the resistivity and the length of the elements forming the circuit. If in Fig. 2 one replaces the part of the circuit situated between the points P and P' by a metal which is a very good conductor of heat and electricity, whose resistance relatively to the resistance comprised between P and P' is negligible, and which has the same cooling surface, one thus reduces by one-half (for instance) the electric resistance of the element under consideration, without any appreciable change in the conditions of calorific equilibrium, the minimum point $T^m$ of the curve (Fig. 3) will be practically the same. If the metal employed is a good conductor, such as copper, silver or the like, it will be feasible to increase its size to a considerable degree, i. e. to increase the cooling surface and to lower the minimum temperature $T^m$ while greatly reducing the electric resistance of the circuit.

I may also reduce the cross section and the length of the metals or alloys of high resistivity which form the thermo-electric couple, and hence the calorific power absorbed, and I may increase the cross section and the cooling surface of the intermediate good conducting part, and thus obtain an apparatus the consumption of which is small and the efficiency of which is much above what can be had with the same apparatus but without the use of the intermediate part made of a good conducting metal, for instance copper.

Figure 4:
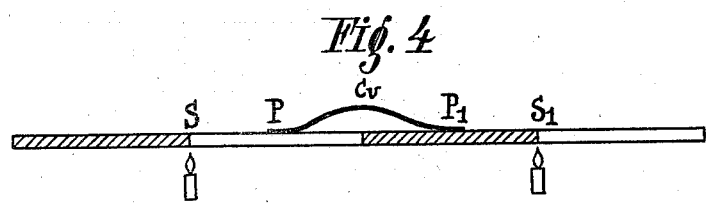
Figs. 4 and 5 show other arrangements of the thermo-electric circuit.

In the preceding example, a part of the circuit consists of the thermo-electric elements themselves and the remainder consists of the copper portion, and the current flows between these two parts. The same result may be had by the device shown in Fig. 4, by shunting a part of the circuit by a good conducting metal. In this event, one connects the points P and P' by a copper strip, for instance, which shunts the cold thermo-electric joint. The electric resistance between the two points P and P' is smaller than the resistance of the copper strip, and the cooling surface is that of the shunt plus that of the cold joint itself.

Figure 5:
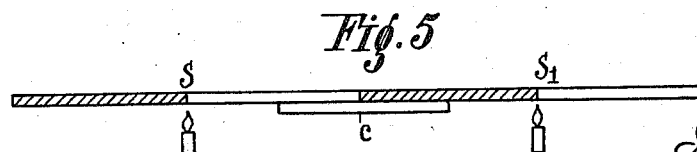

An analogous result can be had by soldering near the cold joint a good conductor $c$, and in this case the cooling surface will not be increased, but the electric resistance will be diminshed (Fig. 5).

A suitable arrangement of the several parts of the apparatus will thus provide for the diminution of the cross section of the soldered joints and hence of the power absorbed for the heating, as well as for the reduction of the electric resistance of the circuit thus formed, while at the same time increasing the cooling surface and hence the difference in temperature between the hot and cold joints.

Fig. 6 shows a preferred form of construction of one of the thermo-electric elements, which constitute the apparatus. It consists of a small stick 1 of an alloy having a great thermo-electric capacity; at 2 is soldered a small bar 3 whose form is such that it will offer a minimum cross section and surface to the heating which takes place at 2, so as to absorb the minimum amount of heat; this bar 3 is made of a copper-nickel alloy (copper 60 per cent and nickel 40 per cent). It is obvious that any suitable metals or alloys may be used for the composition of the thermo-electric couple. To the other end 4 of the stick 1 is soldered a long strip 5 of a good conducting metal, for instance copper, which considerably increases the cooling surface and provides the connection between one couple and the other.

The apparatus shown in Figs. 7 and 8, is constructed as follows:

Between the plates of fibro-cement 6 and 7 are held by means of the bolts and nuts 8 two other plates of fibro-cement 9 and 10, which are wider and shorter than the preceding between which are mounted, and insulated by the mica strips 11', electric resistances which can be placed in circuit upon a supply line.

Against the plates 9 and 10, and at each side are disposed the sticks of the thermo-electric couple above described and shown in Fig. 6. The said sticks are inserted, near the part which is soldered to the copper-nickel member, into the recesses 12 formed in the edges of the plates, and are held by suitable cement. They are vertically disposed in such manner that the soldered joint with the copper-nickel alloy will make contact with a heating element 11, and that the soldered joint with the copper alloy 4, which is the cold joint, shall be at the exterior and well ventilated. The terminals of the heating circuit 13 are mounted in the clamping plates 6 and 7 and are connected to the electric resistances by the wires 14. The terminals 15 of the low-voltage current to be obtained are mounted at the other end of the clamping plates 6 and 7 and are connected to the input and the output ends of the thermo-electric circuit.

As thus constituted, the arrangement of thermo-electric couples will permit of converting the direct or alternating current of the electric supply lines into continuous current at low voltage, and it is chiefly adapted for the supply of audion lamps, and for other analogous uses. The heating of the apparatus, instead of being effected by electric resistances placed between the mica strips 11 and connected with the supply line, might with equal facility be effected in a different manner, for example by a device for the direct heating of the heating element making contact with the joint between the copper-nickel alloy and each of the said sticks.

The number and arrangement of the thermo-electric elements employed may vary according to the use of the apparatus and the voltage desired. Modifications in the details of construction might further be made in each of the said elements as above described. In particular, the form and dimensions of the sticks 1, the bars 3 and 4, as well as the metals or alloys in use, may vary without departing from the principle of the invention, and the form represented in Figs. 6 and 8 is shown solely by way of example.

The construction and assembling of the elements may take place as shown in Figs. 18 and 19, the strips 5 are placed flatwise below a common band 16 of insulating material which connects them together, for instance by rivets 15, and the strips are then bent as shown at $5^e$ and are bent upwardly in such manner that the bent end $5^e$ of one strip will be opposite the bar 3 of the next element. The arrangement being thus disposed, the ends of the strips are placed in a two-part mould 18—Fig. 23—having therein the holes 19, so that the edges $5^b$ and $3^b$ will enter the respective ends or edges of the holes.

The said strips are held in place by the bottom plates 20 and the top or casting plates 21, which latter comprise the casting orifices 22 (Fig. 20).

The set of plates 18, 20, 21 is rigidly secured together by suitable means, and into the orifices 22 is poured the thermo-electric metal or alloy which serves to form the cylinder 1, the mould being preliminarily heated if necessary.

The top plate 21 is then removed, thus producing the rupture of the cylinder 1 at its point of least resistance $22^a$, and the bottom plate 20 is also removed. The welded parts are equalized by a blowpipe (Fig. 22) and they are dressed by a file, if necessary, to obtain smooth surfaces, and chiefly for the heated surface. Finally, the two parts of the mould 18 are opened.

Figs. 23 and 31 show by way of example a construction of the mould, but the latter may obviously have any other adequate construction. In particular, the parts of the mould may be held together in any suitable manner. For instance the two parts of the mould 18 may be connected together by the screws $18^b$, and the top and bottom plates secured to the mould by the nibs $21^b$ and $20^b$.

It should be noted that the bottom plate 20 possesses next the heated joints the concave recesses $20^c$ adapted to receive the alloy forming the cylinder.

After constructing two sets of multiple elements by the moulding process, as above disclosed, they are placed in the opposite position as shown in Figs. 13, 14 and 17 in order to form the thermo-electric battery, in such manner that the heated joints shall be closely adjacent, and these parts are pressed by suitable means against an electric heating resistance 10 which is interposed between the two joints. I prefer to construct this resistance as shown in Fig. 16 so as to concentrate the heat upon the joints which are to be heated and to obviate losses of heat by radiation and conduction.

For this purpose, the said resistance comprises a mica plate or strip 11 whose shape is such as to afford a series of restricted parts adjacent the several cylinders 1, upon these parts is wound the electric heating wire or strip, thus providing heating surfaces which are substantially equal to the heated surfaces of the said cylinders.

The mica strip with its winding is then disposed between two mica strips $11^b$. For the apparatus shown in Figs. 13 and 15, the heating takes place by means of the plate $11^a$ which is separated from the heated joints by the two mica strips $11^b$.

The complete apparatus may be mounted as shown in Figs. 12, 13 and 17.

The thermo-electric elements are held between two asbestos plates 12, and are pressed for example by means of two metal rods 13 connected at the ends by bolts and nuts, in conjunction with the straps 14.

Obviously, the said apparatus may be constructed in any other suitable manner without departing from the principle of the invention.

What I claim is:

1. A thermo-electric couple comprising elements which are oppositely situated in pairs, heating means interposed between the said elements, means exercising pressure upon each pair of the said oppositely situated elements, whereby the hot joints and the cold joints are strongly pressed together, a toothed insulating plate, the part of said plate between two teeth being situated between the two oppositely situated hot joints, and an electric heating resistance wound solely upon the parts of said plate which are situated between two teeth, whereby the heat will be concentrated upon the hot joints and the heat losses by radiation will be obviated.

2. A thermo-electric couple comprising two sets of elements each element comprising a short metal bar having high thermo-electric properties, a long strip of a good conductor of electricity and heat secured at one end to a bar, a stick of high thermal capacity in cast connection between the end of a strip of one element and the bar of adjacent element, the joint between the stick and bar constituting the hot joint, and the hot joints of one set being arranged opposite those of the other set, a serrated insulated member between the two sets of joints, a heating conductor wound on the serrated member in the interdental spaces thereof, and means to electrically insulate the sets of hot joints from the conductor, and means to press the assemblage together.

In testimony that I claim the foregoing as my invention, I have signed my name hereto.

CHARLES MIEVILLE.